United States Patent
Velusamy et al.

(10) Patent No.: US 9,807,669 B1
(45) Date of Patent: Oct. 31, 2017

(54) IDENTIFYING COMMUNICATION PATHS BASED ON PACKET DATA NETWORK GATEWAY STATUS REPORTS

(71) Applicant: Sprint Communications Company L.P., Overland Park, KS (US)

(72) Inventors: Saravana Velusamy, Olathe, KS (US); Sreekar Marupaduga, Overland Park, KS (US); Ryan P. Dreiling, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 128 days.

(21) Appl. No.: 14/523,023

(22) Filed: Oct. 24, 2014

(51) Int. Cl.
*H04L 12/66* (2006.01)
*H04W 40/04* (2009.01)
*H04W 48/00* (2009.01)

(52) U.S. Cl.
CPC ............. *H04W 40/04* (2013.01); *H04L 12/66* (2013.01); *H04W 48/17* (2013.01)

(58) Field of Classification Search
CPC ............................... H04L 12/66; H04W 40/04
USPC ........................................................ 370/331
See application file for complete search history.

(56) References Cited

U.S. PATENT DOCUMENTS

| | | | | |
|---|---|---|---|---|
| 6,584,110 B1 * | 6/2003 | Mizuta | ................. | H04L 47/115 370/352 |
| 7,359,360 B2 * | 4/2008 | Ronneke | ................. | H04L 47/10 370/310 |
| 8,248,962 B2 * | 8/2012 | Zhao | ................... | H04W 76/025 370/252 |
| 2009/0129263 A1 * | 5/2009 | Osborn | ............... | H04W 76/022 370/230 |
| 2009/0228603 A1 * | 9/2009 | Ritzau | ................... | H04L 67/288 709/238 |
| 2009/0285179 A1 | 11/2009 | Jones et al. | | |
| 2010/0208704 A1 * | 8/2010 | Wu | ........................ | H04L 12/66 370/331 |
| 2011/0103310 A1 * | 5/2011 | Stojanovski | ............ | H04L 12/66 370/328 |
| 2012/0033674 A1 * | 2/2012 | Balus | ....................... | H04L 29/06 370/400 |
| 2012/0170552 A1 * | 7/2012 | Oprescu-Surcobe | . | H04W 28/16 370/332 |
| 2012/0252458 A1 * | 10/2012 | Ohnishi | ................ | H04L 43/062 455/436 |
| 2013/0286828 A1 * | 10/2013 | Cho | ....................... | H04W 28/02 370/230 |
| 2014/0003233 A1 * | 1/2014 | Rune | ...................... | H04L 47/125 370/230 |
| 2014/0036677 A1 | 2/2014 | Draznin et al. | | |

(Continued)

*Primary Examiner* — Steven H Nguyen
*Assistant Examiner* — Emmanuel Maglo

(57) ABSTRACT

Examples disclosed herein provide systems, methods, and software to manage communication paths for wireless communication devices. In one example, a method of operating a mobility management entity includes receiving a plurality of status reports from a plurality of packet data network gateways, and identifying a communication request for a wireless communication device. The method further includes determining a communication path for the wireless communication device based on the plurality of status reports, and initiating a communication for the wireless communication device via the communication path.

17 Claims, 7 Drawing Sheets

(56) References Cited

U.S. PATENT DOCUMENTS

| | | | |
|---|---|---|---|
| 2014/0071924 A1* | 3/2014 | Hietalahti | H04L 5/0044 370/329 |
| 2014/0092772 A1* | 4/2014 | Bitar | H04W 8/26 370/254 |
| 2014/0128019 A1* | 5/2014 | Shaikh | H04W 4/22 455/404.1 |
| 2014/0140268 A1* | 5/2014 | Li | H04W 4/22 370/328 |
| 2014/0221002 A1* | 8/2014 | Kahn | H04W 4/021 455/456.1 |
| 2014/0245403 A1* | 8/2014 | Li | H04L 12/66 726/4 |
| 2015/0071171 A1* | 3/2015 | Akiyoshi | H04L 49/70 370/328 |
| 2016/0007402 A1* | 1/2016 | Kim | H04W 76/025 370/252 |
| 2016/0269935 A1* | 9/2016 | Yang | H04W 28/08 |

* cited by examiner

| SUBSCRIBER CAPACITY TABLE 500 |||
| --- | --- | --- |
| APN IDENTIFIER 510 | PGW IDENTIFIER 520 | AVAILABLE CAPACITY 530 |
| APN ID 511 | PGW 521 | CAPACITY 531 |
| APN ID 511 | PGW 522 | CAPACITY 532 |
| APN ID 512 | PGW 523 | CAPACITY 533 |
| ... | ... | ... |
| APN ID 512 | PGW 524 | CAPACITY 534 |

FIGURE 5

IDENTIFYING COMMUNICATION PATHS BASED ON PACKET DATA NETWORK GATEWAY STATUS REPORTS

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some communication systems, gateways, such as packet data network gateways (PGWs) and serving gateways (SGWs) are used to manage the communications as they are delivered across the wireless network. For example, a PGW acts as the interface between the Long-Term Evolution (LTE) network and other packet data networks, such as the Internet or other session initiation protocol networks, whereas the SGW routes data packets between one or more eNodeBs and the PGW.

As more devices attempt to communicate over a network, various PGWs may experience an increase in load. This increase in load may cause poor throughput and latency to the connected end user devices. Further, although some of the PGWs may be experiencing the increase in load, other PGWs within the same LTE network may have available capacity to handle communications from one or more of the wireless devices. Thus, some communications may be impaired despite other communication paths being available to assist the burdened PGWs.

OVERVIEW

Examples disclosed herein provide systems, methods, and software to identify communication paths for wireless communication devices. In one example, a method of operating a mobility management entity includes receiving a plurality of status reports from a plurality of packet data network gateways, and identifying a communication request for a wireless communication device. The method further includes determining a communication path for the wireless communication device based on the plurality of status reports, and initiating a communication for the wireless communication device via the communication path.

BRIEF DESCRIPTION OF THE DRAWINGS

FIG. 5 illustrates a subscriber capacity table to manage capacity information for packet data network gateways.

DETAILED DESCRIPTION

Figure 1:
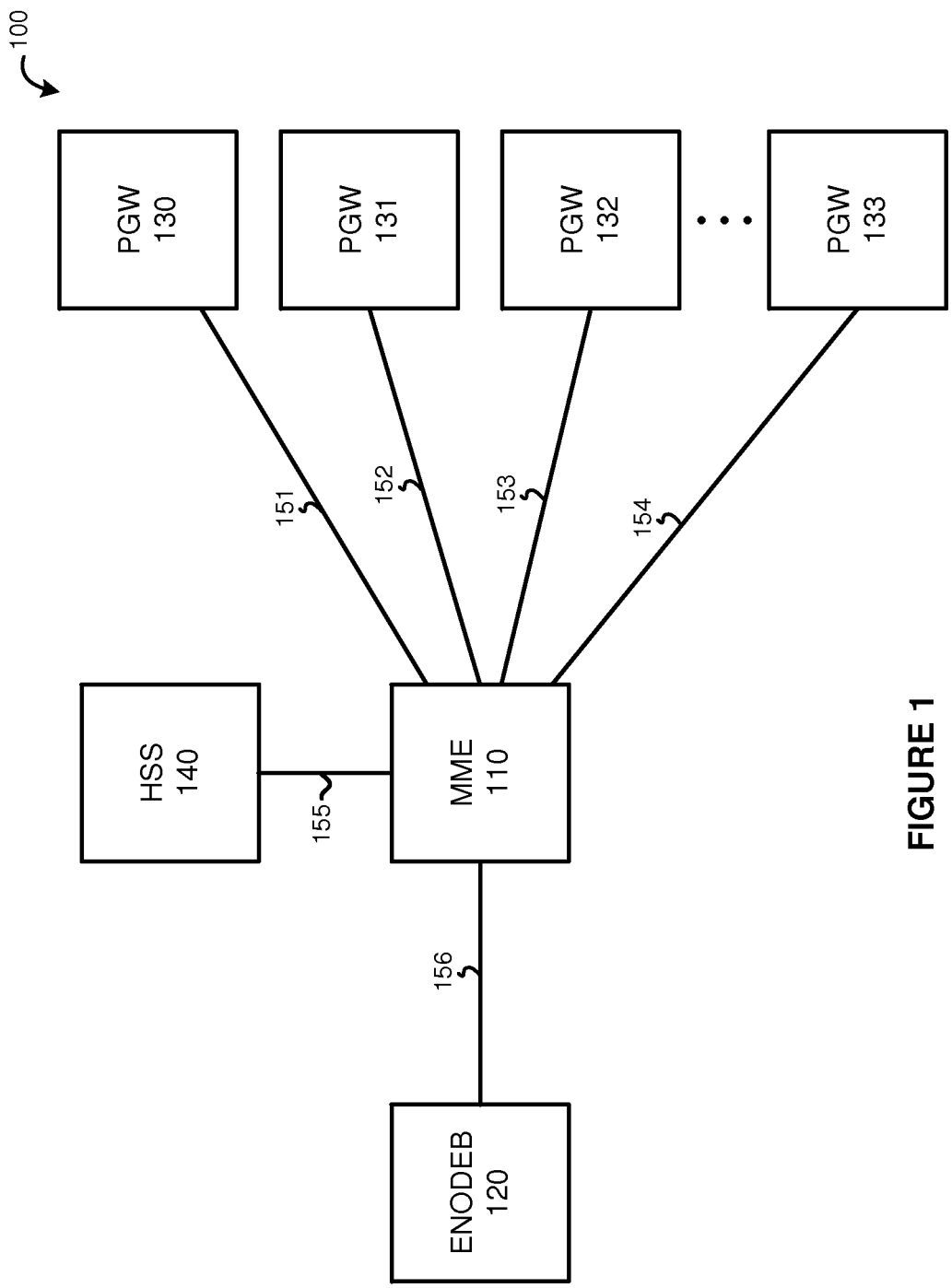
FIG. 1 illustrates a communication system to manage communication paths based on statuses for packet data network gateways.

FIG. 1 illustrates a communication system 100 to manage communication paths based on statuses for packet data network gateways. Communication system 100 includes mobility management entity (MME) 110, eNodeB 120, packet data network gateways (PGWs) 130-133, and home subscriber server (HSS) 140. MME 110 communicates with PGWs 130-133 over communication links 151-154, respectively. MME 110 further communicates with HSS 140 over communication link 155, and also communicates with eNodeB 120 over communication link 156. Although illustrated as a direct link in the present example, it should be understood that communication links 151-154 might each include a serving gateway to act as an intermediary between MME 110 and PGWS 130-133.

In operation, PGWs 130-133 act as an intermediary between the LTE network and other packet data networks, such as the internet. When a wireless communication device (WCD) requires a communication, a request may be transferred from the WCD over base station 120 to MME 110. Once received, MME 110 contacts HSS 140 to authorize the communication. HSS 140 contains the subscription-related information or subscriber profiles for the network, and performs authentication and authorization of the user based on these profiles. HSS 140 may also be used to provide the proper access point name (APN) to handle the communication, which corresponds to the type of PGW necessary to provide the requested data connection. Once the information is gathered from HSS 140, MME 110 configures the communication path for the WCD communication.

Here, in addition to the information provided by HSS 140, MME 110 determines the appropriate communication path based on status reports received from PGWs 130-133. These status reports, or capacity reports, indicate the amount of subscriber capacity remaining at each of the PGWs 130-133. For example, PGW 130 may indicate in a returned report that only ten percent of user bandwidth remains to provide to newly connected devices. In contrast, PGW 132 may indicate that eighty percent of the bandwidth remains to provide to newly connecting WCDs. Based on the information that is provided to MME 110, MME 110 may determine the PGW that would provide the user with the least congested communication path. Using the previous example, this would include identifying PGW 132 over PGW 130 for the communication.

In further examples, MME 110 may also identify a serving gateway (SGW) that is closest in proximity to the identified PGW. Thus, once a PGW is identified based on the available capacities at each of the PGWs, an SGW may also be selected that is closest in geographic proximity to the identified PGW.

Figure 2:
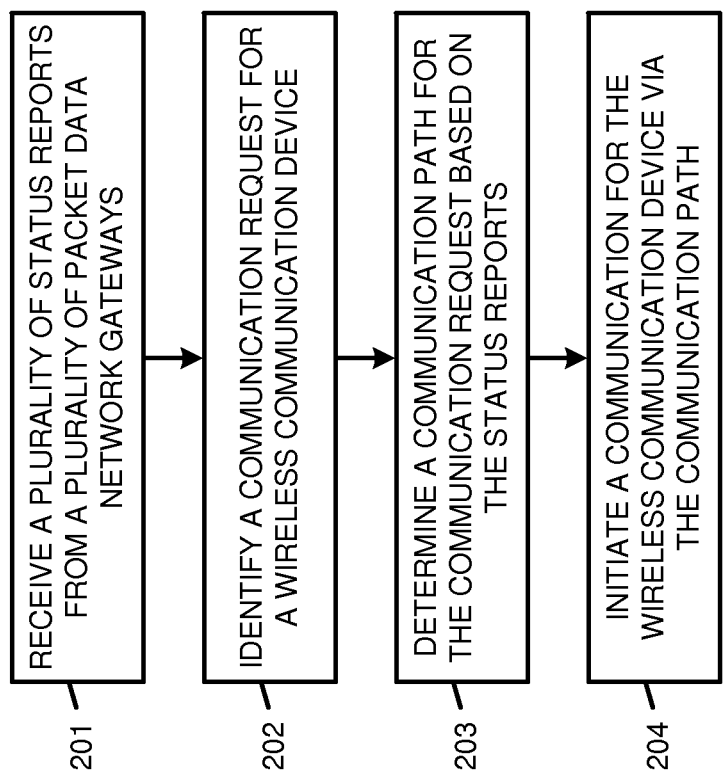
FIG. 2 illustrates a method of operating a mobility management entity to manage communication paths based on statuses for packet data network gateways.

FIG. 2 illustrates a method of operating MME 110 to manage communication paths based on statuses for PGWs 130-133. The method includes receiving a plurality of status reports from a plurality of PGWs 130-133 (201). As described above, these status reports correspond to capacity reports indicating the remaining subscriber capacity for WCD communications. In some examples, this capacity may include the amount of bandwidth available to handle new communications. In other examples, the report may correspond to the number of new WCDs that the PGW can process. These reports may be transferred to MME 110 periodically, such as every few minutes or some other time period, may be transferred to MME 110 upon request from MME 110, or may be transferred at any other interval.

Once the status reports are received, MME 110 may identify a communication request for a WCD (202). Responsive to the request, MME 110 determines a communication path for the communication based on the status reports (203). To identify the communication path, MME 110 may include a table, list, or other data structure that manages information provided in the status reports from the plurality of PGWs. For example, a table may include an identifier for each PGW, as well as the remaining capacity for each of the PGWs. Accordingly, when a communication path is desired for a WCD, MME 110 may refer to the values stored in the table to determine the appropriate PGW for the communication. In some examples, each of the PGWs stored within the data structure may be associated with an APN. Thus, based on the devices profile provided by HSS 140, MME 110 may determine the appropriate PGW from the available PGWs associated with that APN.

In some instances, in addition to identifying the appropriate PGW for a communication, MME may further identify a SGW for a communication based on the status reports. This SGW identification may include identifying the SGW in geographical proximity to the identified PGW. Accordingly, once the PGW is identified based on the status reports and available capacity, MME 110 may identify a corresponding SGW that is the most geographically proximate to the PGW.

Once the gateways are identified for the communication, MME 110 may initiate a communication for the WCD via the identified communication path (204). Although illustrated as communicating with four PGWs in the present example, it should be understood that MME 110 might communicate with any number of PGWs to identify the status reports and configure communication paths.

Figure 3:
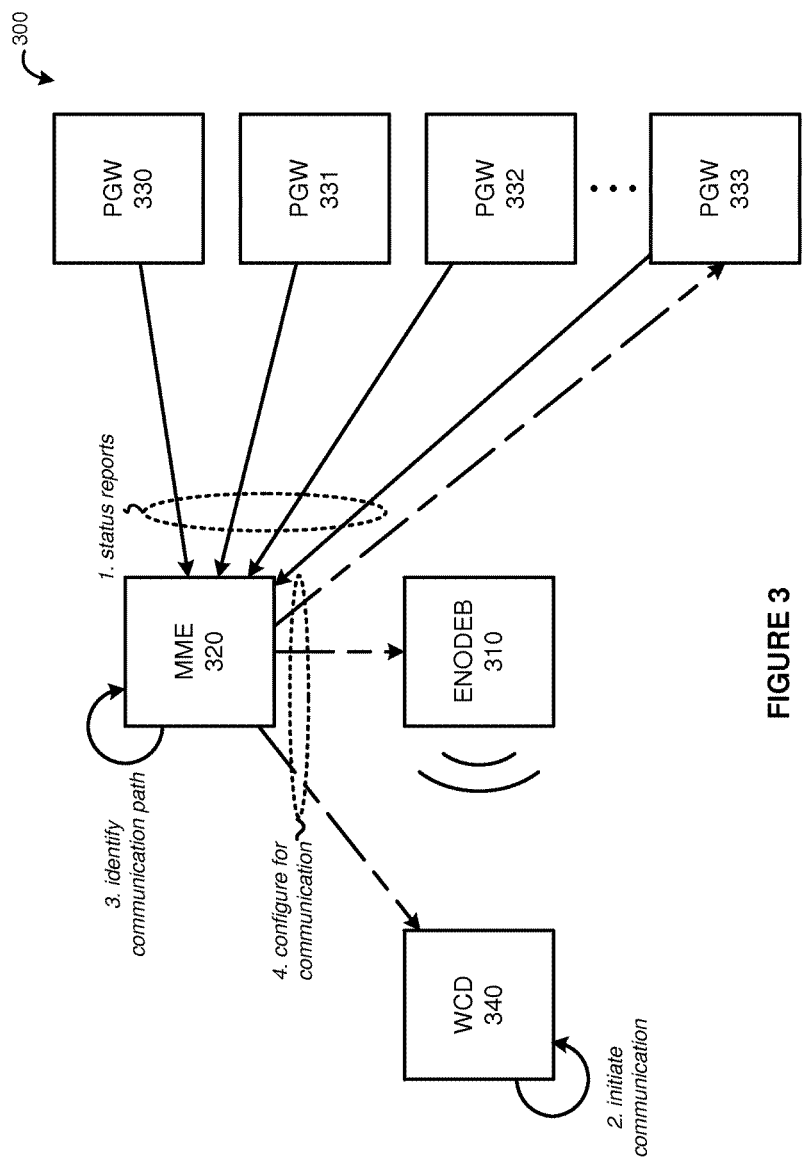
FIG. 3 illustrates an overview of configuring communication paths based on statuses from packet data network gateways.

FIG. 3 illustrates an overview 300 of configuring communication paths based on status from PGWs. Overview 300 includes eNodeB 310, MME 320, PGWs 330-333, and WCD 340. As illustrated, PGWs 330-333 communicate status reports to MME 320 indicating subscriber capacity information for connecting WCDs. This subscriber capacity information may correspond to the amount of bandwidth remaining at each of the PGWs, the number of devices that can communicate with the PGWs, or any other similar information regarding the available capacity at each of the PGWs. Once MME 320 receives the information, MME 320 may organize the capacity information into a data structure, such as a table, list, or some other similar type of data structure. Accordingly, when a device requests a communication, the data structure may be referenced to identify the appropriate PGW to handle the communication.

Once a data structure is created, WCD 340 may initiate a communication request over eNodeB 310. Responsive to the communication request, MME 320 identifies a communication path, which comprises at least a PGW, to handle the communication as requested. In some examples, MME 320 may communicate with a HSS to identify permissions and other profile related information associated with connecting WCD 340. In some instances, this profile information may include an APN for the device, which indicates the types of PGWs available to handle the communication. Based on the APN, MME 320 may identify a PGW of PGWs 330-333 that has enough available capacity and also fulfills the APN requirement for WCD 340.

In some examples, MME 320 may use a domain name system (DNS) request or process to identify a suggested PGW to handle the communication request. Once the suggested PGW is identified, MME 320 may compare the suggested PGW to the data structure containing the capacity information for PGWs 330-333. If there is enough capacity on the suggested PGW, then MME 320 may initiate the communication over the suggested PGW. In contrast, if the suggested PGW does not provide the necessary capacity, MME 320 may initiate a transition to an alternative PGW. This may include overriding the suggested PGW, or transferring a secondary DNS request to identify a new suggested PGW.

In the present instance, responsive to the communication request from WCD 340, MME 320 identifies PGW 333 to handle the communication. Once identified, MME 320 may initiate the communication for WCD 340 by configuring the communication path for the device. Although not illustrated in the present example, it should be understood that MME 320 might further be used to identify an appropriate SGW for the communication based on the identified PGW. This SGW may be the SGW that is closest in geographic proximity to the identified PGW, the SGW that includes the least amount of latency with the PGW, or any other SGW that is identified based on the selection of the PGW.

Further, although illustrated as selecting an initial PGW to handle a communication, it should be understood that similar processes might be used to transition currently communicating devices to alternative PGWs. For example, WCD 340 may initially communicate with the internet or some other packet data network via PGW 333. As the communication occurs, PGWs 330-333 may continue to transfer status reports to MME 320 indicating the capacity available at each of the PGWs. As a result of this information, MME 320 may identify when PGW 333 no longer has the capacity to provide the proper quality of service to WCD 340. Instead, of allowing WCD 340 to continue with the communication over PGW 333, MME 320 may initiate a transition of the communication from PGW 333 to one of PGWs 330-332. In some instances, the transition of the communication may include a detach/reattach process, wherein WCD 340 may be dropped from the current communication path and reattached using a communication path with more available capacity.

Figure 4:
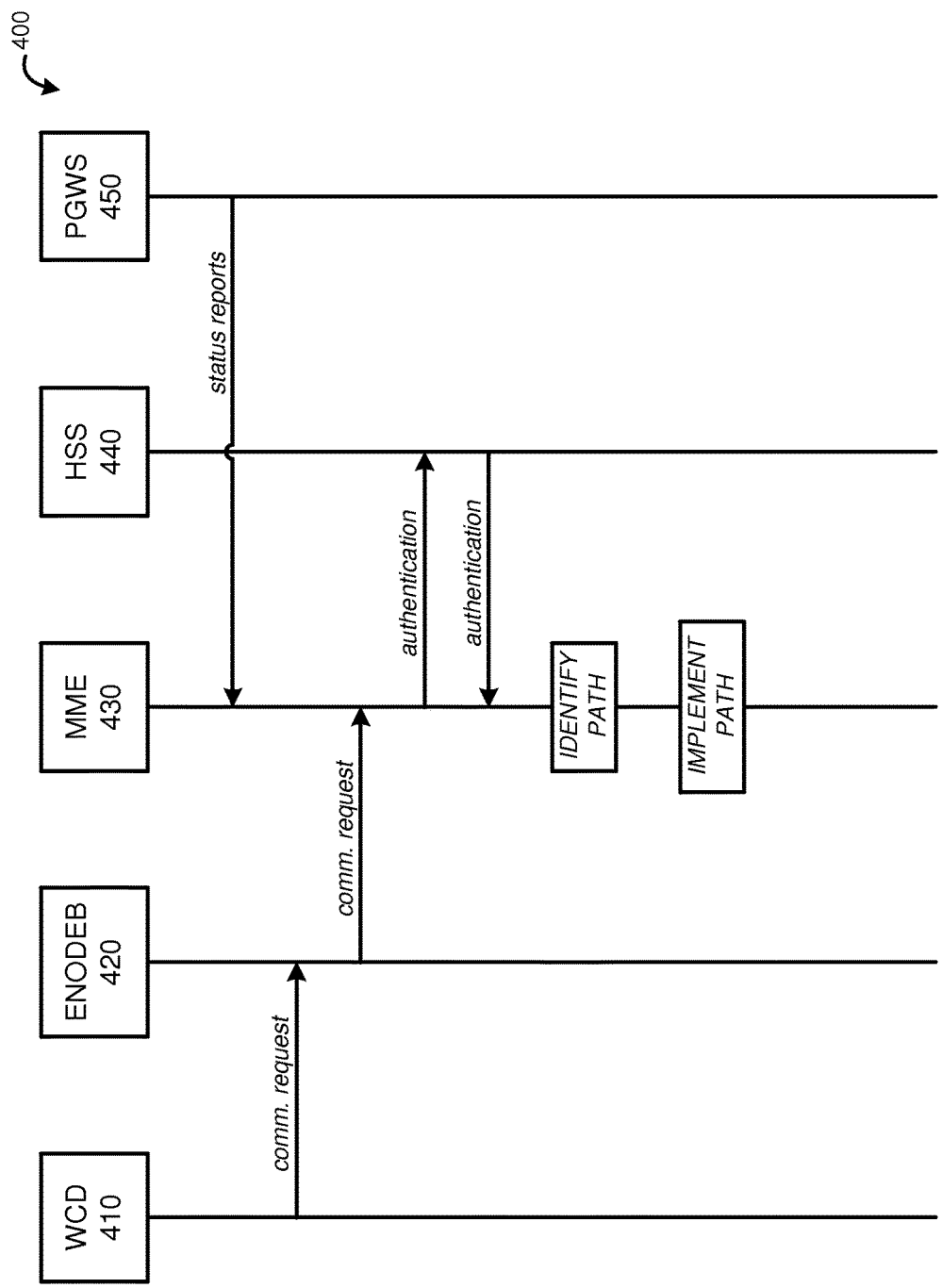
FIG. 4 illustrates a timing diagram to manage communication paths based on statuses from packet data network gateways.

FIG. 4 illustrates a timing diagram 400 to manage communication paths based on statuses from packet data network gateways. Timing diagram 400 includes WCD 410, eNodeB 420, MME 430, HSS 440, and PGWs 450. PGWs 450 represent a plurality of PGWs capable of providing a communication link between the LTE network and packet data networks, such as the internet or other similar networks. As depicted, each of the PGWs in PGWs 450 transfer status reports to MME 430. Although illustrated as a direct path in the present example, it should be understood that the status reports might be communicated over SGWs that act as an intermediary between MME 430 and PGWs 450. In the present example, the status reports that are provided by PGWs 450 include information regarding the available subscriber capacity at each of the PGWs 450. This capacity information for each PGW may include information about the number of new devices that can communicate over the PGW, the amount of bandwidth remaining for new devices, or any other similar capacity information for identified devices.

Once the status reports are communicated to MME 430, WCD 410 may initiate a communication request to eNodeB 420 to be forwarded to MME 430. In response to identifying the communication request, MME 430 authenticates the request using HSS 440. HSS 440 provides subscriber information to MME 420 including, in some examples, an APN for the connecting device. Once the device is authenticated, MME 430 identifies a communication path for the WCD communication based at least in part on the status reports from PGWs 450. In some instances, MME 430 may initiate a DNS process to determine the appropriate domain name location for a default PGW to handle the communication. Once a domain name is retrieved, MME 430 may compare the domain to a data structure that organizes the subscriber capacity information from the PGWs. If the provided PGW includes enough capacity to handle the new communication, MME 430 may initiate the communication using the provided PGW. In contrast, if MME 430 identifies that the provided PGW does not include enough capacity to handle the communication, MME 430 may alter the PGW used in the communication. In some examples, MME 430 may identify a substitute PGW that reported a greater amount of available capacity. In other examples, MME 430 may continue to initiate DNS requests until a PGW is provided that has enough capacity to handle the new communication.

In some occurrences, the capacity determination may be based on a ratio representing the amount of capacity remaining for a PGW. For example, as the capacity information is reported to MME 430, MME 430 may organize the information into a data structure, such as a table or list, to reference the current state of each PGW. Within the data structure, values, such as percentages, ratios, or some other value may be assessed to define the remaining capacity at each PGW. For example, one PGW may identify that ninety percent of its capacity is being used, whereas another PGW may report that twenty-five percent of its capacity is being used. Consequently, when WCD 410 requires the communication, MME 430 may prevent the communication from being assigned to the ninety percent PGW, and assign the communication to the PGW with the lesser load. In some instances, the redirection may occur when a PGW fails to meet predefined criteria. For example, MME 430 may be configured to prevent communications over any PGW with a capacity of eighty percent or more. Accordingly, MME 430 may continue to identify PGWs until a PGW meets the predefined capacity criteria.

Although illustrated in the previous example as redirecting new communications, it should be understood that similar principles might be applied to current communications. For instance, once a PGW fails to meet the capacity criteria, one or more currently communicating devices may be detached from the current PGW and reattached to an alternative PGW. These devices may be high priority devices, the devices that have been communicating the longest, the devices executing a particular application, or any other device identifier. Once the devices are identified, the MME may assist the devices in being reattached to a PGW with more available capacity.

FIG. 5 illustrates a subscriber capacity table 500 to manage the available packet data network gateways for communications. Subscriber capacity table 500 includes APN identifier 510, PGW identifier 520, and available capacity 530. Although illustrated as a table in the present example, it should be understood that any type of data structure including lists, arrays, or other type of data structure might be used to organize the status information provided by PGWs. In operation, a plurality of PGWs may transfer status reports to a MME to allow the MME to identify communication paths for connecting WCDs. As the reports are received, the MME organizes the received information into a data structure, such as subscriber capacity table 500. In the present example, the information included within the table includes APN identifiers 510 for each of the PGWs, PGW identifiers for each of the PGWs, and the available capacity 530 for each of the PGWs. APN identifier 510 corresponds to the APN that is associated with one or more of the PGWs. Here, two PGWs are assigned to each APN identifier (ID) 511-512.

As a communication request is received by the MME, the MME will be used to define a communication path to be used by a WCD in communicating with the internet or other similar packet data network. To define an appropriate PGW for the communication, the MME may identify PGWs that fail to meet capacity criteria and no longer provide the capacity necessary to serve the device. For example, if a WCD required a communication using APN ID 511, the WCD may be routed through PGW 521 or PGW 522. If the MME determines that capacity 531 associated with PGW 521 falls outside of the criteria for attaching the WCD, the MME may refuse to route the communication through PGW 521. Instead, the MME may identify other PGWs associated with APN ID 511, in this case PGW 522. Accordingly, if capacity 532 includes a larger amount of available capacity, the MME may route the WCD communication through PGW 522.

Although described in the previous example as identifying new communication paths for connecting WCDs, it should be understood that similar principles might be used to modify the communication path for currently communicating devices. Accordingly, as status reports are received from the various PGWs and processed within subscriber capacity table 500, the MME may determine one or more devices that could be transitioned to an alternative PGW. These identified devices may include devices with a higher priority, devices executing particular applications, devices that have been communicating the longest, or any other similar determination. For instance, a WCD may be communicating with the internet using APN ID 512 with PGW 523. Once the available capacity for PGW 523 fails to meet a capacity criteria, the MME may detach the WCD from PGW 523, and reattach the device to PGW 524 that is associated with the same APN ID. Thus, rather than be restricted by the overloaded PGW, the communication may be transferred to a PGW that meets the capacity criteria.

Further, although not illustrated in the present example, it should be understood that each PGW might also be associated with an SGW. Accordingly, once a PGW is identified to support the communication for the device, the SGW that is closest in geographical proximity to the identified PGW may also be identified for the communication. Once both are determined, the MME may initiate the communication path for the WCD using the gateways.

Figure 6:
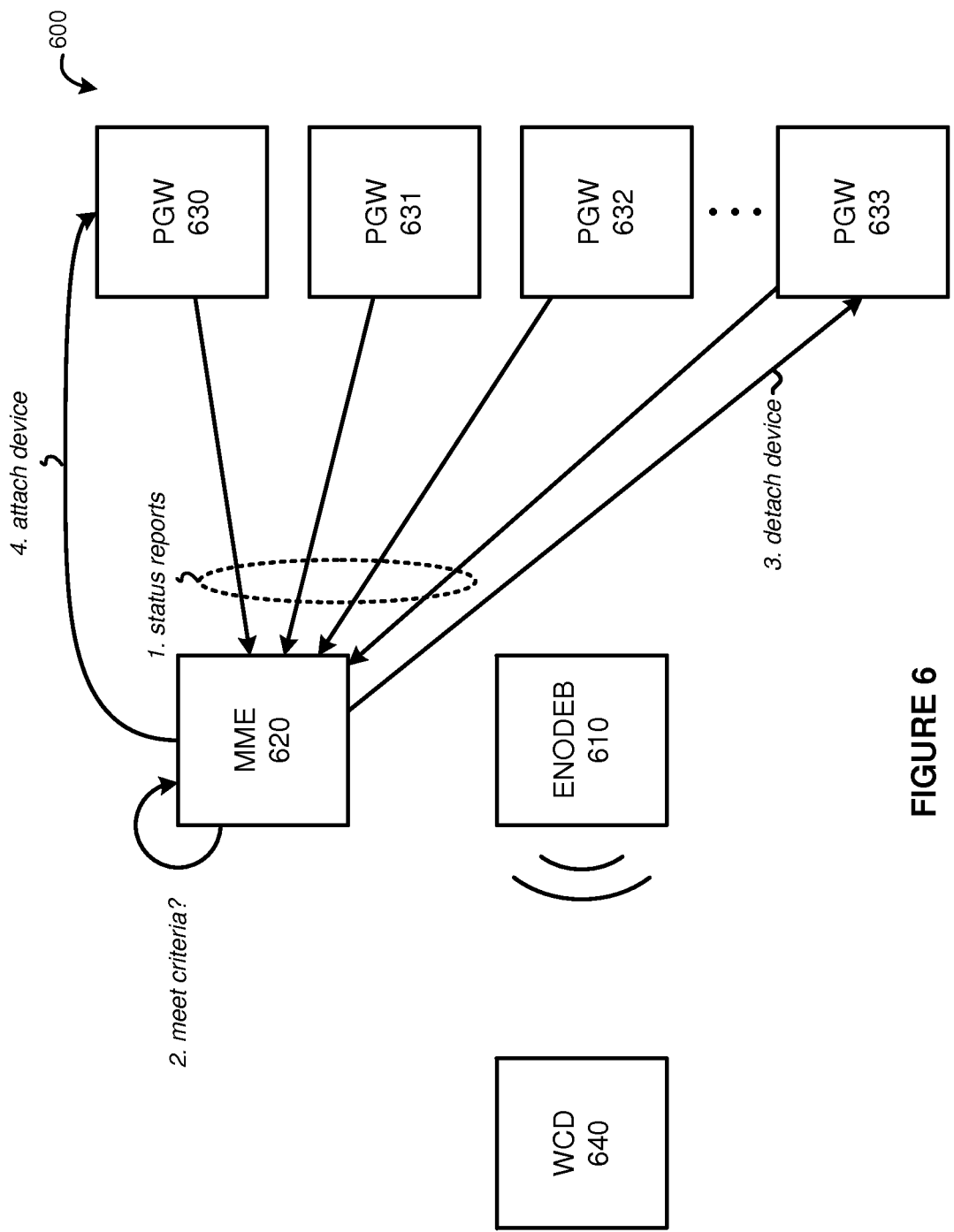
FIG. 6 illustrates an overview of detaching and attaching wireless communication devices from packet data network gateways based on status reports from the packet data network gateways.

FIG. 6 illustrates an overview 600 of detaching and attaching wireless communication devices from packet data network gateways based on status reports from a plurality of packet data network gateways. Overview 600 includes eNodeB 610, MME 620, PGWs 630-633, and WCD 640. In operation, WCD communicates with the internet or some other packet data network over eNodeB 610 and PGW 633. As the communication occurs, PGWs 630-633 transfer status reports to MME 620 corresponding to the available subscriber capacity at each of PGWs 630-633. This available capacity may correspond to the remaining amount of bandwidth at each PGW, the number of new devices that each PGW can process, or any other similar information. Once the status reports are received, MME 620 may compare the information provided by the PGWs with criteria to determine if communication paths should be modified to reduce the congestion at a particular PGW. In the present example, MME 620 identifies that PGW 633 fails to meet the predefined capacity criteria. Responsively, MME 620 may identify that the communication for WCD 640 should be transitioned to a PGW with lesser amount of congestion. To identify an appropriate WCD to transition, a variety of factors may be used, such as the priority level assigned to the device, the priority level assigned to the communication or application on the device, or any other similar factor.

Once WCD 640 is identified, the alternative PGW may be identified based on the current congestion level provided in the status reports. For example, MME 620 may identify any PGW that has available capacity within the predefined criteria. Once the PGW is determined, MME 620 may initiate the transition of the devices communication from the first PGW 633 to the second PGW 630. To accomplish this task, MME 620 may first detach WCD 640 from communicating via PGW 633, and subsequently reattach WCD 640 to PGW 630 before proceeding with the communication.

Although not illustrated in FIG. 6, it should be understood that any PGW that WCD 640 is rerouted to might be assigned the same APN as the original PGW. Thus, MME 620 may only identify PGWs for the device based on the APN used in original communication. Further, although they are not illustrated in the present example, it should be understood that the communication for WCD 640 might include a SGW that acts as an intermediary between eNodeB 610 and PGWs 630-633. To identify the proper SGW, MME 620 may identify the SGW that is closest in geographic proximity to the identified PGW, the SGW with the lowest latency with the identified PGW, or any other proximity measurement. Thus, if the PGW for the communication is changed in the middle of a communication, so too is the SGW.

Figure 7:
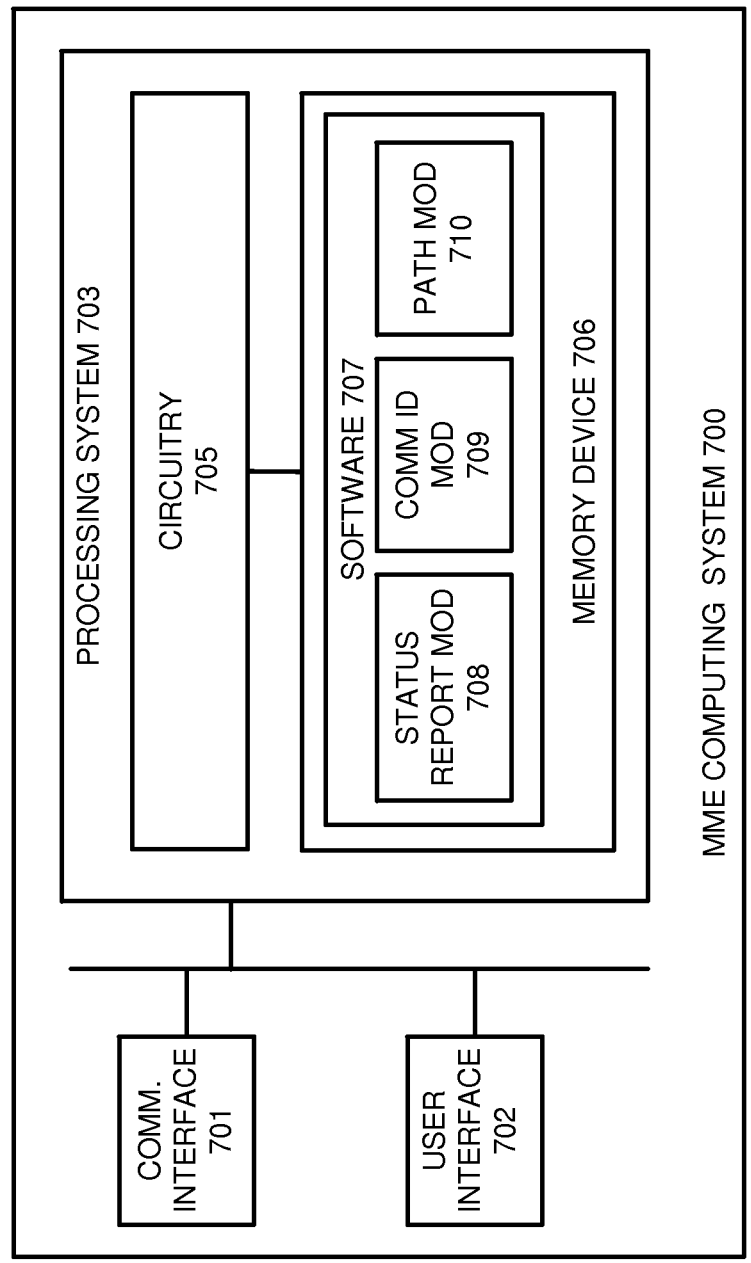
FIG. 7 illustrates a mobility management entity computing system to manage communication paths based on statuses for packet data network gateways.

FIG. 7 is a MME computing system 700 to manage communication paths based on statuses for PGWs. MME computing system 700 is representative of a computing system that may be employed in any computing apparatus, system, or device, or collections thereof, to suitably implement the MMEs described herein. Computing system 700 comprises communication interface 701, user interface 702, and processing system 703. Processing system 703 is communicatively linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof. In particular, communication interface 701 is configured to receive status reports from a plurality of PGWs, and transfer configuration information to establish communication paths for connecting WCDs.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes status report module 708, communication ID module 709, and path module 710, although any number of software modules may provide the same operation. Operating software 707 may further include an operating system, utilities, drivers, network interfaces, applications, or some other type of software. When executed by circuitry 705, operating software 707 directs processing system 703 to operate MME computing system 700 as described herein.

In particular, status report module 708 is configured to receive a plurality of status reports from a plurality of PGWs within a LTE network. These status reports correspond to the amount of available subscriber capacity at each of the PGWs, and may comprise the amount of devices that can be added to a PGW, the amount of bandwidth remaining at a PGW, or any other capacity information. In response to receiving the status reports, status report module 708 may organize the information provided into a data structure, such as a table, list, array, or any other data structure capable of managing the information.

Once the status information is received from the available PGWs, communication ID module 709 may identify a new communication request for a WCD. Responsive to this request, path module 710 may be used to identify the appropriate communication path to handle the communication. Specifically, path module 710 may be used to identify a PGW to handle the communication request based on the status report information received. For example, responsive to receiving a communication request, a DNS operation may be performed to identify a default PGW for a communication. Once the default PGW is retrieved, the default PGW may be compared against the status information to determine if the default PGW has enough available capacity to process the new communication. If the PGW does have enough capacity, MME computing system 700 may configure the communication path to use the default PGW. In contrast, if default PGW does not include the requisite capacity, MME computing system 700 may initiate a redirect to an alternative PGW that includes a larger amount of available capacity.

In some examples, the determination of whether a PGW has enough capacity to handle a communication may be based on predefined criteria. For example, if any PGW is at eighty percent capacity or higher, MME computing system 700 may refuse to direct communications through that PGW. Instead, computing system 700 may proceed to identify other PGWs until a PGW is identified that contains the requisite amount of capacity.

Once the PGW is identified for the communication, PGW computing system 700 may further identify a proper SGW to handle the communication for the WCD. This SGW may, in some examples, include the SGW that is closest in geographical proximity to the identified PGW. Accordingly, once a PGW is identified, any SGW may also be identified that is within a geographic proximity to the PGW for the communication path.

Although described above as identifying an initial communication path for a WCD, it should be understood that similar principles might be used to determine when to modify a communication path for a WCD. For example, the status report information identified by status report module 708 may be used to determine when a PGW is overloaded and unable to properly serve all of the connected devices. Once identified, MME computing system 700 may identify one or more devices connected to the overloaded PGW to be redirected to an alternative PGW. This identification of the one or more devices may include identifying devices with the highest priority level, identifying devices executing a particular application, identifying devices that have been communicating the longest, or any other identification of the devices. Once identified, MME computing system 700 may detach the identified devices and reattach the devices to a PGW with a larger amount of remaining capacity.

Returning to the elements of FIG. 1, eNodeB 120, MME 110, HSS 140, and PGWs 130-133 may each include communication interfaces, network interfaces, processing systems, computer systems, microprocessors, storage systems, storage media, or some other processing devices or software systems, and can be distributed among multiple devices. In particular, eNodeB may be configured to provide LTE wireless coverage to one or more wireless communication devices. MME 110 is a key control node with the LTE access network and is responsible for identifying the proper PGW and SGW for a communication with a WCD. HSS 140 is an authentication service containing subscription information for the various connecting WCDs. HSS 140 may further be used to define an APN for each of the WCD communications. PGWs 130-133 provide connectivity between the LTE network and various packet data networks, such as the internet or an IP multimedia subsystem (IMS).

Communication links 150-156 each use metal, glass, optical, air, space, or some other material as the transport media. Communication links 150-156 may use Time Division Multiplex (TDM), asynchronous transfer mode (ATM), IP, Ethernet, synchronous optical networking (SONET), hybrid fiber-coax (HFC), circuit-switched, communication signaling, wireless communications, or some other communication format, including improvements thereof. Communication link 150-156 may each be a direct link, or can include intermediate networks, systems, or devices, and can include a logical network link transported over multiple physical links.

Each of the WCDs that communicate with eNodeB 120 may include telephones, computers, gaming systems, tablets, or other similar devices. Although not illustrated in the present example, it should be understood that SGWs might act as an intermediary between eNodeB 120 and PGWs 130-133 when a device is communicating with the network.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a mobility management entity to route communications based on service capacity, the method comprising:
   receiving a plurality of status reports indicating subscriber capacity information from a plurality of packet data network gateways;
   identifying a communication request for a wireless communication device;
   determining a communication path for the wireless communication device based on the plurality of status reports from the plurality of packet data network gateways by identifying an available packet data network gateway for the communication path with enough capacity to handle the communication request based on the subscriber capacity information; and
   initiating a communication for the wireless communication device via the communication path;
   wherein determining the communication path for the wireless communication device based on the plurality of status reports from the plurality of packet data network gateways comprises:
   performing a domain name system procedure to identify a default packet data network gateway for the communication request;
   determining whether the default packet data network gateway meets a capacity criteria based on a status report for the default packet data network gateway;
   if the default packet data network gateway meets the capacity criteria, identifying the default packet data network gateway as the available packet data network gateway for the communication path; and
   if the default packet data network gateway does not meet the capacity criteria, identifying an alternative packet data network gateway that meets the capacity criteria as the available packet data network gateway for the communication path.

2. The method of claim 1 wherein each status report in the plurality of status reports indicating the subscriber capacity information comprises a capacity report corresponding to a subscriber capacity available at a packet data network gateway in the plurality of packet data network gateways.

3. The method of claim 2 wherein the subscriber capacity comprises a device capacity corresponding to a number of new wireless communication devices that the packet data network gateway can support.

4. The method of claim 2 wherein the subscriber capacity comprises a bandwidth capacity corresponding to a remaining bandwidth that the packet data network gateway can support.

5. The method of claim 2 wherein determining the communication path for the wireless communication device based on the plurality of status reports by identifying the available packet data network gateway for the communication path with enough capacity to handle the communication request based on the subscriber capacity information comprises determining an the available packet data network gateway based on a capacity report for the available packet data network gateway meeting a capacity criteria.

6. The method of claim 5 wherein determining the communication path for the wireless communication device further comprises identifying a serving gateway nearest in geographical proximity to the available packet data network gateway.

7. The method of claim 6 wherein initiating the communication for the wireless communication device via the communication path comprises initiating the communication for the wireless communication device via the available packet data network gateway and the serving gateway.

8. The method of claim 1 further comprising, in response to identifying the communication request for the wireless communication device, identifying an access point name for the communication request, and wherein determining the communication path for the wireless communication device based on the plurality of status reports from the plurality of packet data network gateways comprises determining the communication path for the wireless communication device based on the plurality of status reports from the plurality of packet data network gateways and the access point name for the communication request.

9. The method of claim 1 further comprising:
identifying a packet data network gateway in the plurality of packet data network gateways that fails to meet a capacity criteria;
identifying one or more wireless communication devices currently communicating over the packet data network gateway; and
transitioning the one or more wireless communication devices to an alternative packet data network gateway.

10. A computer apparatus to route communications based on service capacity, the computer apparatus comprising:
processing instructions that direct a mobility management entity (MME), when executed by the MME, to:
receive a plurality of status reports indicating subscriber capacity information from a plurality of packet data network gateways;
identify a communication request for a wireless communication device;
determine a communication path for the wireless communication device based on the plurality of status reports from the plurality of packet data network gateways by identifying an available packet data network gateway for the communication path with enough capacity to handle the communication request based on the subscriber capacity information; and initiate a communication for the wireless communication device via the communication path; and
one or more non-transitory computer readable media that store the processing instructions;
wherein determining determine the communication path for the wireless communication device based on the plurality of status reports from the plurality of packet data network gateways direct the MME to:
perform a domain name system procedure to identify a default packet data network gateway for the communication request;
determine whether the default packet data network gateway meets a capacity criteria based on a status report for the default packet data network gateway;
if the default packet data network gateway meets the capacity criteria, identify the default packet data network gateway as the available packet data network gateway for the communication path; and
if the default packet data network gateway does not meet the capacity criteria, identify an alternative packet data network gateway that meets the capacity criteria as the available packet data network gateway for the communication path.

11. The computer apparatus of claim 10 wherein each status report in the plurality of status reports indicating the subscriber capacity information comprises a capacity report corresponding to a subscriber capacity available at a packet data network gateway in the plurality of packet data network gateways.

12. The computer apparatus of claim 11 wherein the subscriber capacity comprises a device capacity corresponding to a number of new wireless communication devices that the packet data network gateway can support.

13. The computer apparatus of claim 11 wherein subscriber capacity comprises a bandwidth capacity corresponding to a remaining bandwidth that the packet data network gateway can support.

14. The computer apparatus of claim 11 wherein the processing instructions to determine the communication path for the wireless communication device based on the plurality of status reports by identifying the available packet data network gateway for the communication path with enough capacity to handle the communication request based on the subscriber capacity information direct the MME to determine an the available packet data network gateway based on a capacity report for the available packet data network gateway meeting a capacity criteria.

15. The computer apparatus of claim 14 wherein the processing instructions to determine the communication path for the wireless communication device further direct the MME to identify a serving gateway nearest in geographical proximity to the available packet data network gateway.

16. The computer apparatus of claim 15 wherein the processing instructions to initiate the communication for the wireless communication device via the communication path direct the MME to initiate the communication for the wireless communication device via the available packet data network gateway and the serving gateway.

17. The computer apparatus of claim 10 wherein the processing instructions further direct the MME to, in response to identifying the communication request for the wireless communication device, identify an access point name for the communication request, and wherein the processing instructions to determine the communication path for the wireless communication device based on the plurality of status reports from the plurality of packet data network gateways direct the MME to determine the communication path for the wireless communication device based on the plurality of status reports from the plurality of packet data network gateways and the access point name for the communication request.

* * * * *